(12) United States Patent
Chandran et al.

(10) Patent No.: US 10,942,601 B2
(45) Date of Patent: *Mar. 9, 2021

(54) MUTUAL HOVER PROTECTION FOR TOUCHSCREENS

(71) Applicant: STMicroelectronics Asia Pacific Pte Ltd, Singapore (SG)

(72) Inventors: Praveesh Chandran, Singapore (SG); Gee-Heng Loh, Singapore (SG); Ravi Bhatia, Singapore (SG); Ys On, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/532,872

(22) Filed: Aug. 6, 2019

(65) Prior Publication Data

US 2019/0361564 A1 Nov. 28, 2019

Related U.S. Application Data

(63) Continuation of application No. 14/852,847, filed on Sep. 14, 2015, now Pat. No. 10,416,802.

(51) Int. Cl.
*G09G 5/00* (2006.01)
*G06F 3/041* (2006.01)
*G06F 3/044* (2006.01)

(52) U.S. Cl.
CPC ........ *G06F 3/04166* (2019.05); *G06F 3/0443* (2019.05); *G06F 2203/04108* (2013.01)

(58) Field of Classification Search
CPC ...... G06F 3/0416; G06F 3/041; G06F 3/0412; G06F 3/044–0448; G06F 2203/04108;
(Continued)

(56) References Cited

U.S. PATENT DOCUMENTS 7,541,816 B1 6/2009 Liao et al.
10,416,802 B2 * 9/2019 Chandran ............... G06F 3/044
(Continued)

FOREIGN PATENT DOCUMENTS

CN 104428741 A 3/2015

OTHER PUBLICATIONS

First Office Action and Search Report from co-pending CN Appl. No. 201610822838.8 dated Sep. 29, 2018 (7 pages).

*Primary Examiner* — Jennifer T Nguyen
(74) *Attorney, Agent, or Firm* — Crowe & Dunlevy

(57) ABSTRACT

A capacitive sensing structure includes a first sensing electrode located in a first layer for sensing a first capacitance and producing a first sense signal indicative of the sensed first capacitance. A transmit electrode is located in the first layer and positioned surrounding 90%+ of a perimeter of the first sensing electrode. A second sensing electrode is located in the first layer and positioned surrounding 90%+ of a perimeter of the transmit electrode, the second sensing electrode to sense a second capacitance and produce a second sense signal indicative of the sensed second capacitance. Controller circuitry receives the first and second sense signals, compares a change in the sensed first capacitance to a change in the sensed second capacitance, and produces an output signal indicative of a user touch based upon the comparison between the change in the sensed first capacitance and the change in the sensed second capacitance.

20 Claims, 7 Drawing Sheets

(58) Field of Classification Search
CPC . G06F 2203/04104; G06F 2203/04112; G06F 1/16; G06F 1/1692
USPC .................................... 345/174; 178/18.06
See application file for complete search history.

(56) References Cited

U.S. PATENT DOCUMENTS

| | | | |
|---|---|---|---|
| 2013/0257785 A1 | 10/2013 | Brown et al. | |
| 2014/0009428 A1* | 1/2014 | Coulson | G06F 3/044 345/174 |
| 2015/0316956 A1 | 11/2015 | Yu et al. | |
| 2015/0370364 A1* | 12/2015 | Jordan | G06F 3/0442 345/174 |
| 2017/0177114 A1 | 6/2017 | Frey et al. | |

* cited by examiner

MUTUAL HOVER PROTECTION FOR TOUCHSCREENS

RELATED APPLICATION

This application is a continuation of U.S. application for patent Ser. No. 14/852,847, filed Sep. 14, 2015, the contents of which are incorporated by reference to the maximum extent allowable under the law.

FIELD OF THE INVENTION

The present disclosure generally relates to capacitive touchscreen panels and, more particularly, to a touch sensor pattern for use in capacitive touchscreens.

BACKGROUND

Conventional touchscreen sensors are designed to detect a user touch, wherein the user touch is generally conveyed using a finger or a stylus. Many styli are designed with a small surface area for contacting the touchscreen device. For example, a stylus may have a contact surface area of approximately 1 mm in diameter. A stylus having a small contact surface area is more difficult to detect than a stylus having a larger contact surface area. Many conventional touchscreen devices compensate for the difficultly of detecting a stylus having a small contact surface area by increasing the sensitivity of the touch sensors, for example, by decreasing the capacitive detection threshold of the touch sensors.

Unfortunately, when the sensitivity of the touch sensors is increased, false touch detections also increase. Most commonly, false touch detections occur when the user hovers a finger over a touch sensor, but does not actually touch the sensor and does not intend to touch the sensor. In some instances, a false touch detection can occur when the finger is hovering 1-3 mm above the surface of the touchscreen. Because such false touch detections are undesirable, a need exists in the art for improved touch sensors for use in single layer and multi-layer stack configurations of capacitive touchscreens.

SUMMARY

The present disclosure provides a capacitive sensing structure, including: a first sensing electrode configured to sense a first capacitance and produce a first sense signal indicative of the sensed first capacitance; a transmit electrode positioned substantially around a perimeter of the first sensing electrode; a second sensing electrode positioned substantially around a perimeter of the transmit electrode, the second sensing electrode configured to sense a second capacitance and produce a second sense signal indicative of the sensed second capacitance; and controller circuitry configured to receive the first and second sense signals, to compare a change in the sensed first capacitance to a change in the sensed second capacitance, and to produce an output signal indicative of a user touch based upon the comparison between the change in the sensed first capacitance and the change in the sensed second capacitance.

In another embodiment, the present disclosure provides capacitive sensing circuitry, including: a capacitive sensing structure, having: a first sensing electrode configured to sense a first capacitance and produce a first sense signal indicative of the sensed first capacitance; and a transmit electrode; a second sensing electrode positioned substantially around a perimeter of the capacitive sensing structure, the second sensing electrode configured to sense a second capacitance and produce a second sense signal indicative of the sensed second capacitance; and controller circuitry configured to receive the first and second sense signals, to compare a change in the sensed first capacitance to a change in the sensed second capacitance, and to produce an output signal indicative of a user touch based upon the comparison between the change in the sensed first capacitance and the change in the sensed second capacitance.

In yet another embodiment, the present disclosure provides a method for detecting a touch, the method including: applying a force signal to a capacitive sensing structure having a transmit electrode and a first sensing electrode; sensing a first capacitance via the first sensing electrode; generating a first sense signal indicative of the sensed first capacitance; sensing a second capacitance via a second sensing electrode, wherein the second sensing electrode is positioned substantially around a perimeter of the capacitive sensing structure; generating a second sense signal indicative of the sensed second capacitance; comparing a change in the sensed first capacitance to a change in the sensed second capacitance; and generating an output signal indicative of a user touch based upon the comparison between the change in the sensed first capacitance and the change in the sensed second capacitance.

In an embodiment, the present disclosure provides for a capacitive sensing structure, the capacitive sensing structure including: a first sensing electrode located in a first layer and configured to sense a first capacitance and produce a first sense signal indicative of the sensed first capacitance; a transmit electrode located in the first layer and positioned surrounding at least 90% of a perimeter of the first sensing electrode; a second sensing electrode located in the first layer and positioned surrounding at least 90% of a perimeter of the transmit electrode, the second sensing electrode configured to sense a second capacitance and produce a second sense signal indicative of the sensed second capacitance; and controller circuitry configured to receive the first and second sense signals, to compare a change in the sensed first capacitance to a change in the sensed second capacitance, and to produce an output signal indicative of a user touch based upon the comparison between the change in the sensed first capacitance and the change in the sensed second capacitance.

In an embodiment, the present disclosure provides for capacitive sensing circuitry, including: a capacitive sensing structure having: a first sensing electrode located in a first layer and configured to sense a first capacitance and produce a first sense signal indicative of the sensed first capacitance; and a transmit electrode located in the first layer; a second sensing electrode located in the first layer and positioned surrounding at least 90% of a perimeter of the capacitive sensing structure, the second sensing electrode configured to sense a second capacitance and produce a second sense signal indicative of the sensed second capacitance; and controller circuitry configured to receive the first and second sense signals, to compare a change in the sensed first capacitance to a change in the sensed second capacitance, and to produce an output signal indicative of a user touch based upon the comparison between the change in the sensed first capacitance and the change in the sensed second capacitance In an embodiment, the present disclosure provides for a method for detecting a touch, the method including: applying a force signal to a capacitive sensing structure comprising a transmit electrode and a first sensing electrode each located in a same first layer; sensing a first capacitance via the first sensing electrode; generating a first sense signal indicative of the sensed first capacitance; sensing a second capacitance via a second sensing electrode located in the first layer, wherein the second sensing electrode is positioned surrounding at least 90% of a perimeter of the capacitive sensing structure; generating a second sense signal indicative of the sensed second capacitance; comparing a change in the sensed first capacitance to a change in the sensed second capacitance; and generating an output signal indicative of a user touch based upon the comparison between the change in the sensed first capacitance and the change in the sensed second capacitance.

The foregoing and other features and advantages of the present disclosure will become further apparent from the following detailed description of the embodiments, read in conjunction with the accompanying drawings. The detailed description and drawings are merely illustrative of the disclosure, rather than limiting the scope of the invention as defined by the appended claims and equivalents thereof.

BRIEF DESCRIPTION OF THE DRAWINGS

Embodiments are illustrated by way of example in the accompanying figures not necessarily drawn to scale, in which like numbers indicate similar parts, and in which.

DETAILED DESCRIPTION

The present disclosure provides a touch sensor and method for detecting a small contact surface area without incurring a false touch detection resulting from a user's finger hovering over the touch sensor. In other words, the disclosed touch sensor and method are capable of distinguishing between a finger hovering above the touch sensor and a touch from a stylus having a small contact surface area without having to adjust the sensitivity of the touch sensor.

Figure 1:
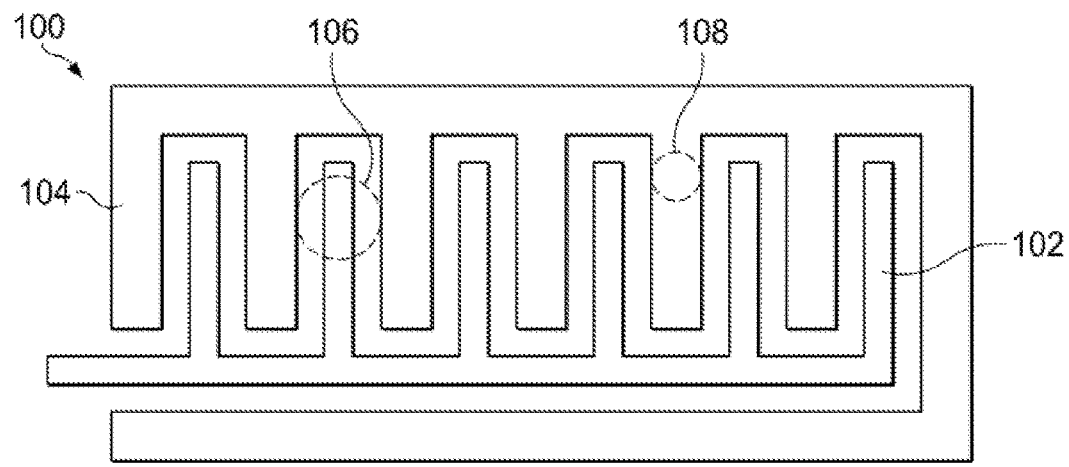
FIG. 1 illustrates a conventional touch sensor pattern for use in a capacitive touchscreen.

Reference is now made to FIG. 1, which illustrates an example embodiment of a conventional touch sensor 100 having a sensing electrode 102 and a transmit electrode 104. In operation, the touch sensor 100 receives a force signal applied to the transmit electrode 104. A capacitance exists between the transmit electrode 104 and the sensing electrode 102. A touch applied to the touch sensor 100 results in a change in the capacitance between the transmit electrode 104 and the sensing electrode 102. This capacitance change is used to detect the user touch.

For example, in the embodiment illustrated in FIG. 1, the capacitance between the transmit electrode 104 and the sensing electrode 102 has an initial value when there is no touch. When a stylus having a contact surface area of 1 mm (referred to herein as a "1 mm stylus") contacts the touch sensor 100 at location 106 above the sensing electrode 102, the capacitance between the transmit electrode 104 and the sensing electrode 102 experiences a capacitance change that is substantial enough to recognize the touch (for example, by exceeding some capacitance change threshold). Similarly, when the 1 mm stylus contacts the touch sensor 100 at a location 108 above the transmit electrode 104, the capacitance between the transmit electrode 104 and the sensing electrode 102 again experiences a substantial enough of a change to be recognized as a touch. Thus, a 1 mm stylus touch practically anywhere on the touch sensor 100 causes a substantial enough of a capacitance change to indicate a touch on the touch sensor 100.

Although the conventional touch sensor 100 is capable of detecting a touch with a 1 mm stylus, the sensor 100 also detects a touch when a finger is hovering approximately 1-3 mm above the sensor 100. For example, a finger having an approximate contact surface area of 7 mm, and hovering approximately 1 mm above the touch sensor 100, is capable of triggering a capacitance change that is similar to the capacitance change caused by the actual touch of the 1 mm stylus. As such, it is difficult to distinguish between a 1 mm stylus touch and a finger hovering over the touch sensor 100 using the embodiment illustrated in FIG. 1.

The following description is directed to a touch sensor and method for detecting a touch that are capable of distinguishing between a finger hovering above the touch sensor and a touch from a stylus having a small contact surface area without having to adjust the sensitivity of the touch sensor. In essence, the disclosed touch sensor incorporates a second sensing electrode positioned substantially around a perimeter of the existing touch sensor circuitry (i.e., the transmit electrode and first sensing electrode). A first capacitance exists between the first sensing electrode and the transmit electrode, and a second capacitance exists between the second sensing electrode and the transmit electrode. In some embodiments, a change in the first capacitance is compared to a change in the second capacitance. When the difference between the change in the first capacitance and the change in the second capacitance is large enough, the touch sensor indicates a touch detection. Otherwise, it does not. In other embodiments, the first capacitance is compared to the second capacitance. When the difference between the first capacitance and the second capacitance is large enough, the touch sensor indicates a touch detection. Otherwise, it does not.

Figure 2:
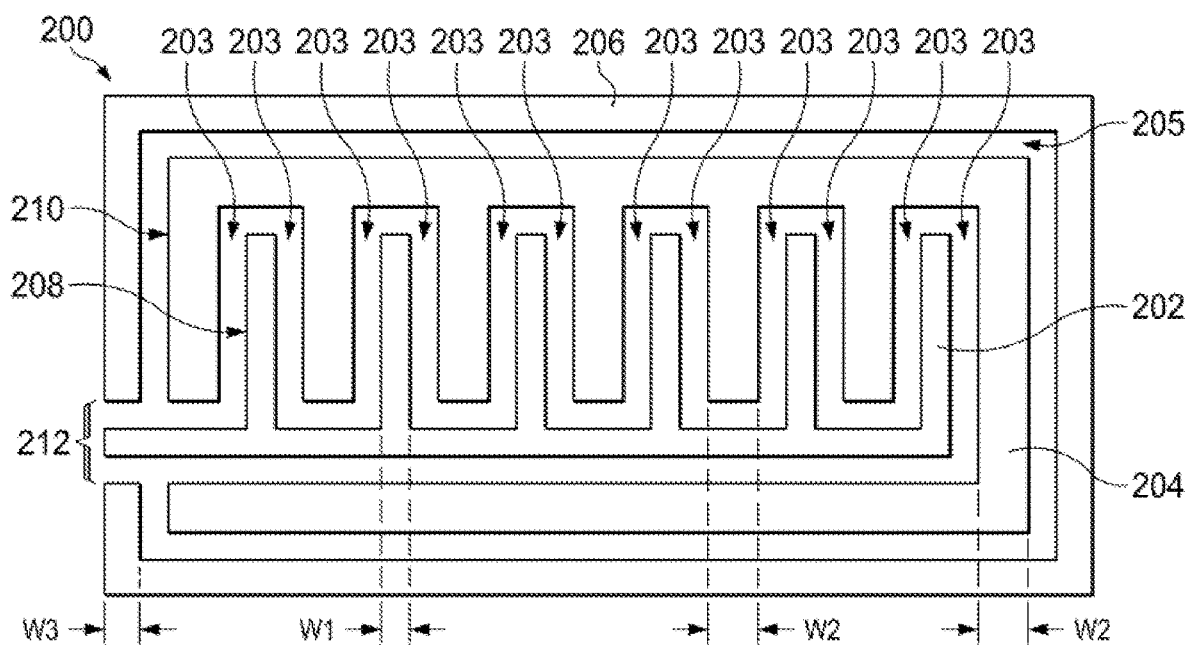
FIG. 2 illustrates a first example embodiment of a touch sensor pattern for use in a capacitive touchscreen application in accordance with the present disclosure.

Reference is now made to FIG. 2, which illustrates an example embodiment of a touch sensor 200 for use in detecting a touch in a capacitive touchscreen application, wherein the touch sensor 200 is capable of distinguishing between a finger hovering above the touch sensor 200 and a touch from a stylus having a small contact surface area without having to adjust the sensitivity of the touch sensor 200. The touch sensor 200 includes a first sensing electrode 202, a transmit electrode 204, and a second sensing electrode 206. In the embodiment illustrated in FIG. 2, the first sensing electrode 202 includes a plurality of finger structures 208 interdigitated with finger structures 210 of the transmit electrode 204. The second sensing electrode 206 is positioned substantially around the perimeter of the transmit electrode 204. In this context, substantially refers to at least 90% of the perimeter of the transmit electrode 204. To accommodate a single-layer touchscreen configuration, or a configuration where the first and second sensing electrodes are on the same layer, the pattern of the second sensing electrode 206 includes an opening 212 to allow for electrical connections to the transmit electrode 204 and/or first sensing electrode 202.

The example touch sensor 200 illustrated in FIG. 2 includes a first set of gaps 203 between each of the interdigitated finger structures 208 and 210. The touch sensor 200 also includes a gap 205 between the transmit electrode 204 and the second sensing electrode 206. In accordance with the example embodiment illustrated in FIG. 2, the gaps 203 are 0.2 mm, the gap 205 is 0.3 mm, the finger structures 208 have a width w1 of 0.3 mm, the finger structures 210 have a width w2 of 0.8 mm, and the second sensing electrode 206 has a width w3 of 0.6 mm. It should be appreciated that these measurements are not intended to be limiting, but are provided as an example.

In operation, controller circuitry (not shown) applies a force signal to the transmit electrode 204. A first capacitance exists between the transmit electrode 204 and the first sensing electrode 202, and a second capacitance exists between the transmit electrode 204 and the second sensing electrode 206. The first and second capacitances each have an initial, steady state value when there is no touch. As a stylus or finger approaches the touch sensor 200, the first and second capacitances are affected by the approaching object. Specifically, as the object approaches the second sensing electrode 206, the second capacitance changes, and as the object approaches the first sensing electrode 202, the first capacitance changes.

Accordingly, the respective first and second capacitances (or the changes in the respective first and second capacitances) are indicative of the location of the approaching object with respect to the first sensing electrode 202 and the second sensing electrode 206. When the first capacitance (or change in the first capacitance) is greater than the second capacitance (or change in the second capacitance), the object is closer to the first sensing electrode 202 than it is to the second sensing electrode 206. Conversely, when the second capacitance (or change in the second capacitance) is greater than the first capacitance (or change in the first capacitance), the object is closer to the second sensing electrode 206 than it is to the first sensing electrode 202. Thus, a touch may be determined by considering the respective first and second capacitances (or changes in the respective first and second capacitances) in view of the known locations of the first and second sensing electrodes 202 and 206 in the touch sensor 200. Moreover, a larger object, such as a finger, hovering above the touch sensor 200 may be distinguished from a touch from a stylus having a small contact surface area without having to adjust the sensitivity of the touch sensor 200.

For example, in the embodiment illustrated in FIG. 2, the first sensing electrode 202 is located toward the center of the touch sensor 200 and the second sensing electrode 206 is located along the perimeter of the touch sensor 200. Therefore, when the first capacitance (or change in the first capacitance) is substantially greater (e.g., 20% greater) than the second capacitance (or change in the second capacitance), the touch object (i.e., stylus or finger) is positioned closer to the center of the touch sensor 200 than it is to the perimeter of the touch sensor 200 where the second sensing electrode 206 is located. When this condition occurs, the controller circuitry indicates detection of a user touch.

Conversely, when the second capacitance (or change in the second capacitance) is greater than the first capacitance (or change in the first capacitance), the touch object is positioned closer to the perimeter of the touch sensor 200 than it is to the center of the touch sensor 200. When this condition occurs, the controller circuitry indicates that there is no detection of a user touch, because the touch object is located closer to the perimeter of the touch sensor 200 than it is to the center of the touch sensor 200.

Similarly, when the first capacitance (or change in the first capacitance) is similar to the second capacitance (or change in the second capacitance), the controller circuitry indicates that there is no detection of a user touch, because the touch object is not located substantially closer to the center of the touch sensor 200 than it is to the perimeter of the touch sensor 200. This last condition is typically indicative of a finger hovering above the touch sensor 200.

Figure 3:
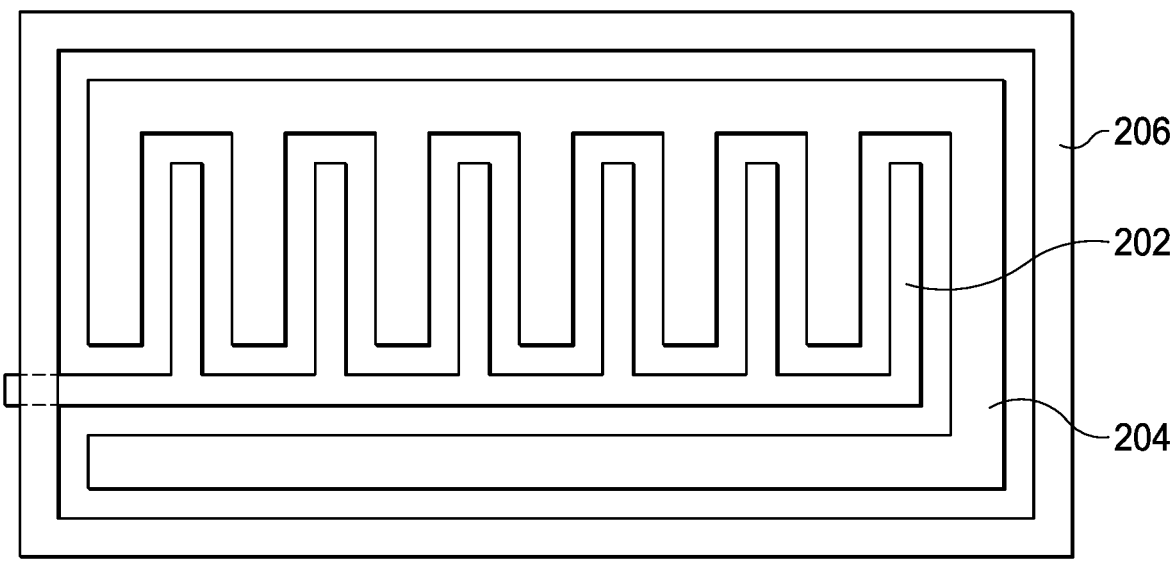
FIG. 3 illustrates an alternate embodiment of the touch sensor pattern of FIG. 2 shown in a multilayer stack configuration.

Although the touch sensor 200 shown in FIG. 2 is illustrated as a sensor in a single-layer touchscreen application, the touch sensor 200 may be implemented in a multilayer stack configuration. For example, the transmit electrode 204 may comprise a first layer of the multilayer stack configuration, and the first sensing electrode 202 and second sensing electrode 206 may comprise a second layer of the multilayer stack configuration. Alternatively, the first sensing electrode 202 and the transmit electrode 204 may comprise a first layer of the multilayer stack configuration, and the second sensing electrode 206 may comprise a second layer of the multilayer stack configuration. In such an embodiment, the second sensing electrode 206 may be positioned around the entire perimeter of the transmit electrode 204 and may omit the opening 212. An example of such a configuration is illustrated in FIG. 3.

Figure 4:
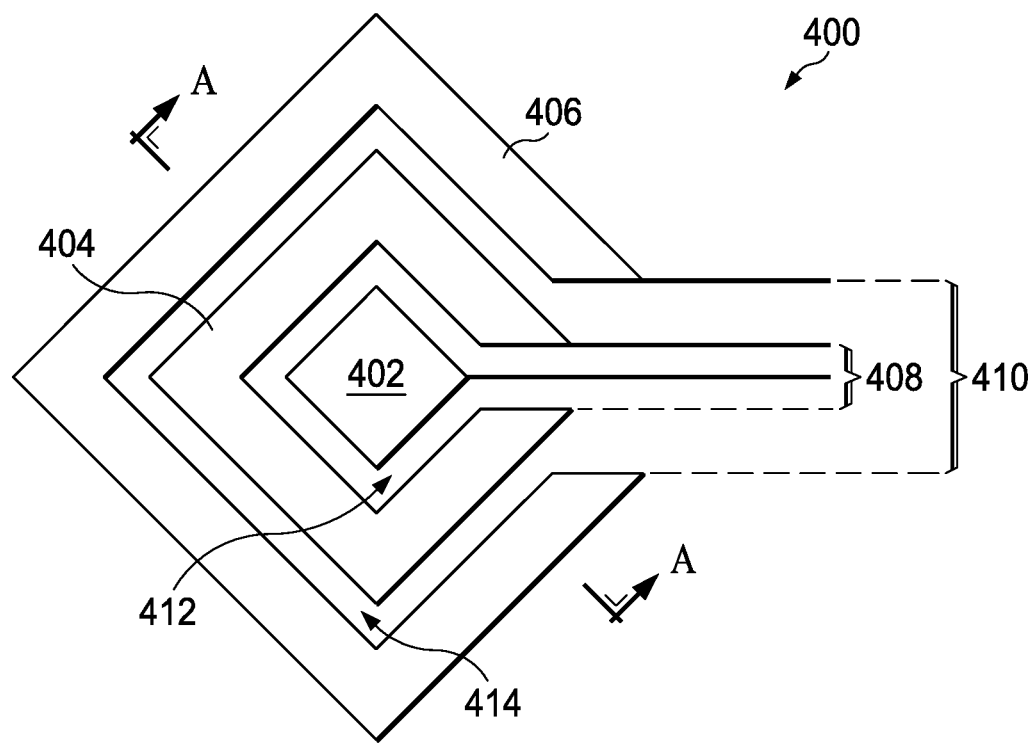
FIG. 4 illustrates a second example embodiment of a touch sensor pattern for use in a capacitive touchscreen application in accordance with the present disclosure.

FIG. 4 illustrates an alternate embodiment of a touch sensor 400 in accordance with the present disclosure, wherein the touch sensor 400 is capable of distinguishing between a finger hovering above the touch sensor 400 and a touch from a stylus having a small contact surface area without having to adjust the sensitivity of the touch sensor 400. The touch sensor 400 includes a first sensing electrode 402, a transmit electrode 404, and a second sensing electrode 406. The embodiment illustrated in FIG. 4 is similar in function to that shown in FIG. 2, but instead provides a diamond shape. For example, the first sensing electrode 402 is diamond-shaped and the transmit electrode 404 substantially surrounds the perimeter of the first sensing electrode 402. The second sensing electrode 406 substantially surrounds the perimeter of the transmit electrode 404.

In the embodiment illustrated in FIG. 4, the transmit electrode 404 includes an open region 408 to allow for electrical connection to the first sensing electrode 402, and the second sensing electrode 406 includes an open region 410 to allow for electrical connection to the first sensing electrode 402 and to the transmit electrode 404. The first sensing electrode 402 and the transmit electrode 404 are separated by a first gap 412. The transmit electrode 404 and the second sensing electrode 406 are separated by a second gap 414. The embodiment of the touch sensor 400 illustrated in FIG. 4 is shown in a single-layer touchscreen application. However, the touch sensor 400 may be implemented in a multilayer stack configuration, in which case one or more of the open regions 408 and 410 may be eliminated.

For example, the transmit electrode 404 may comprise a first layer of the multilayer stack configuration, and the first sensing electrode 402 and second sensing electrode 406 may comprise a second layer of the multilayer stack configuration. In such an embodiment, the transmit electrode 404 may be positioned around the entire perimeter of the first sensing electrode 402 and may eliminate the open region 408. Alternatively, the first sensing electrode 402 and the transmit electrode 404 may comprise a first layer of the multilayer stack configuration, and the second sensing electrode 406 may comprise a second layer of the multilayer stack configuration. In such an embodiment, the second sensing electrode 406 may be positioned around the entire perimeter of the transmit electrode 404 and may eliminate the open region 410.

Figure 5A:
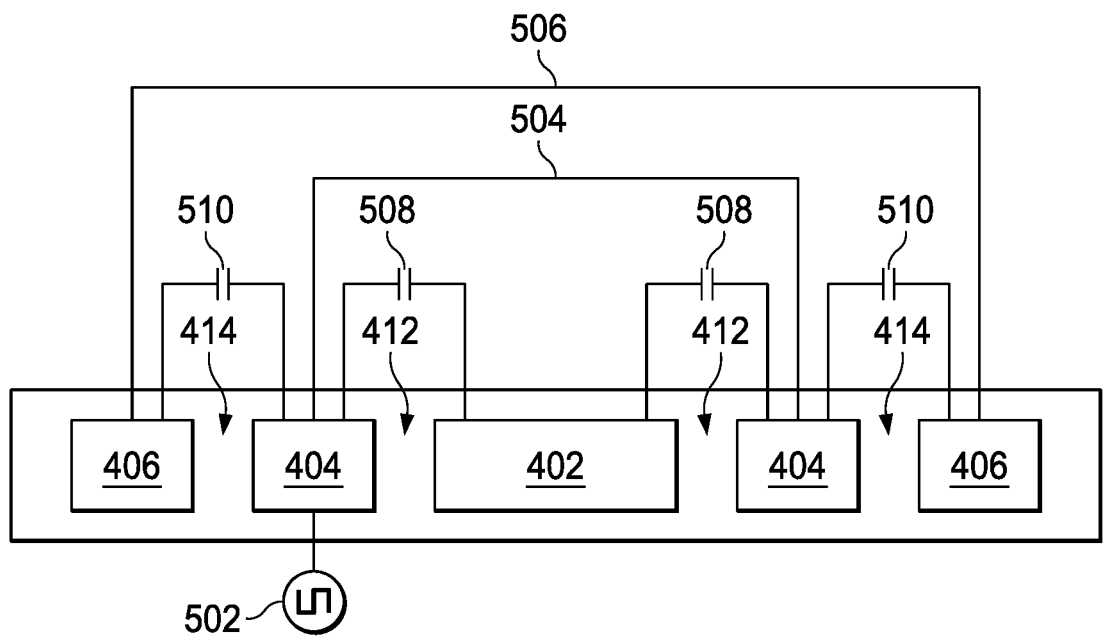
FIGS. 5A, 5B, and 5C illustrate a cross-sectional view of the touch sensor illustrated in FIG. 4.

Operation of the touch sensor 400 is now discussed with reference to FIGS. 5A, 5B, and 5C, which illustrate a cross-sectional view of the touch sensor 400 as viewed along line A-A of FIG. 4. In FIG. 5A, line 504 indicates an electrical connection between the illustrated portions of the transmit electrode 404, and line 506 illustrates an electrical connection between the illustrated portions of the second sensing electrode 406. It should be appreciated that the operation of the touch sensor 400 as illustrated and described with respect to FIGS. 5A, 5B, and 5C, is not limited to the sensor pattern 400 illustrated in FIG. 4, but may also be applied to other sensor patterns designed in accordance with the present disclosure, including the touch sensor 200 illustrated in FIG. 2.

In operation, controller circuitry (not shown) applies a force signal 502 to the transmit electrode 404. A first capacitance 508 exists between the transmit electrode 404 and the first sensing electrode 402, and a second capacitance 510 exists between the transmit electrode 404 and the second sensing electrode 406. The first and second capacitances 508 and 510 each have an initial, steady state value when there is no touch. As a stylus or finger approaches the touch sensor 400 (see FIGS. 5B and 5C), the first and second capacitances 508 and 510 are affected by the approaching object. Specifically, as the object approaches the second sensing electrode 406, the second capacitance 510 changes, and as the object approaches the first sensing electrode 402, the first capacitance 508 changes. Accordingly, the respective first and second capacitances 508 and 510 (or the changes in the respective first and second capacitances 508 and 510) are indicative of the location of the approaching object with respect to the first sensing electrode 402 and the second sensing electrode 406. This information may be used to detect a touch.

When the first capacitance 508 (or change in the first capacitance 508) is greater than the second capacitance 510 (or change in the second capacitance 510), the object is closer to the first sensing electrode 402 than it is to the second sensing electrode 406. Conversely, when the second capacitance 510 (or change in the second capacitance 510) is greater than the first capacitance 508 (or change in the first capacitance 508), the object is closer to the second sensing electrode 406 than it is to the first sensing electrode 402. Thus, a touch may be determined by considering the respective first and second capacitances 508 and 510 (or the changes in the respective first and second capacitances 508 and 510) in view of the known locations of the first and second sensing electrodes 402 and 406 in the touch sensor 400. Moreover, a larger object, such as a finger, hovering above the touch sensor 400 may be distinguished from a touch from a stylus having a small contact surface area without having to adjust the sensitivity of the touch sensor 400.

Figure 5B:
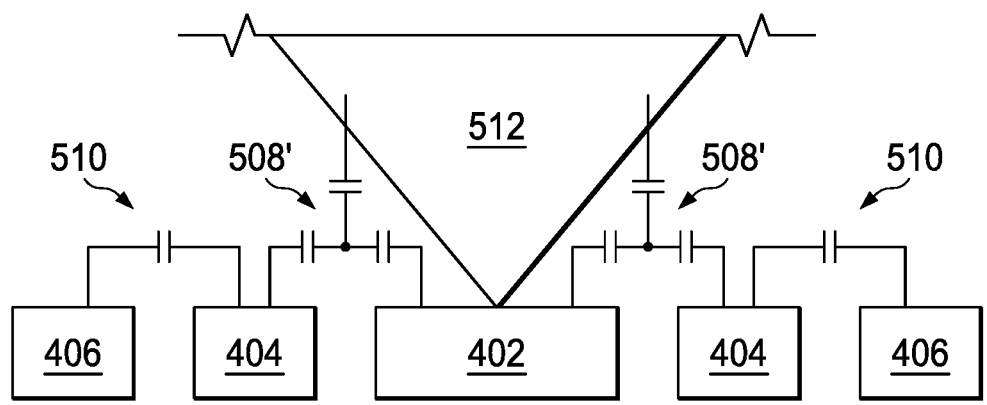
Figure 5C:
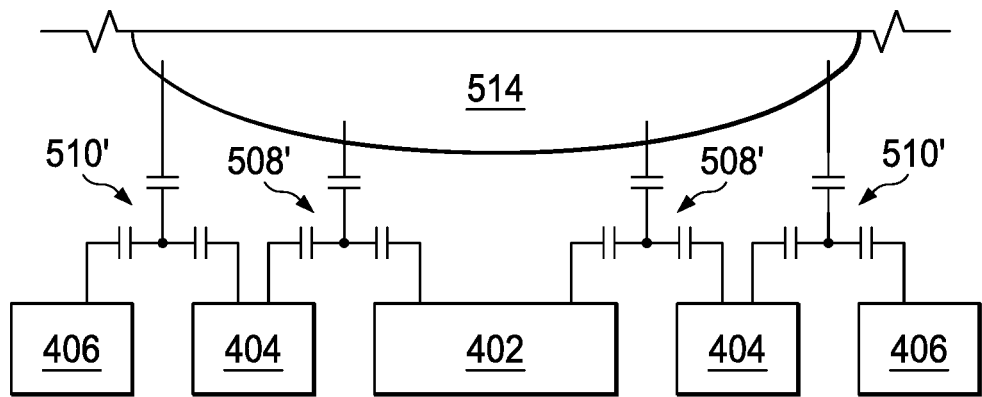

For example, the embodiment illustrated in FIG. 5B shows a 1 mm stylus 512 touching the touch sensor 400 at the first sensing electrode 402. Due to the size of the stylus 512 and the location of its touch, the stylus touch causes a substantial change in the first capacitance 508 (shown in FIG. 5B as changed first capacitance 508') with minimal impact on the second capacitance 510. As shown in FIG. 5B, when the first capacitance 508 (or change in the first capacitance 508) is substantially greater (e.g., 20% greater) than the second capacitance 510 (or change in the second capacitance 510), the touch object is positioned closer to the center of the touch sensor 400 than it is to the perimeter of the touch sensor 400 where the second sensing electrode 406 is located. When this condition occurs, the controller circuitry indicates detection of a user touch.

In contrast, when a finger 514 is hovering over the touch sensor 400, as shown in FIG. 5C, the first capacitance 508 (or change in the first capacitance 508) (shown in FIG. 5C as changed first capacitance 508') is similar to the second capacitance 510 (or change in the second capacitance 510 (shown in FIG. 5C as changed second capacitance 510'). When this condition occurs, the controller circuitry considers the capacitance changes to be occurring as a result of a finger hover and, as such, indicates that there is no detection of a user touch.

Figure 6:
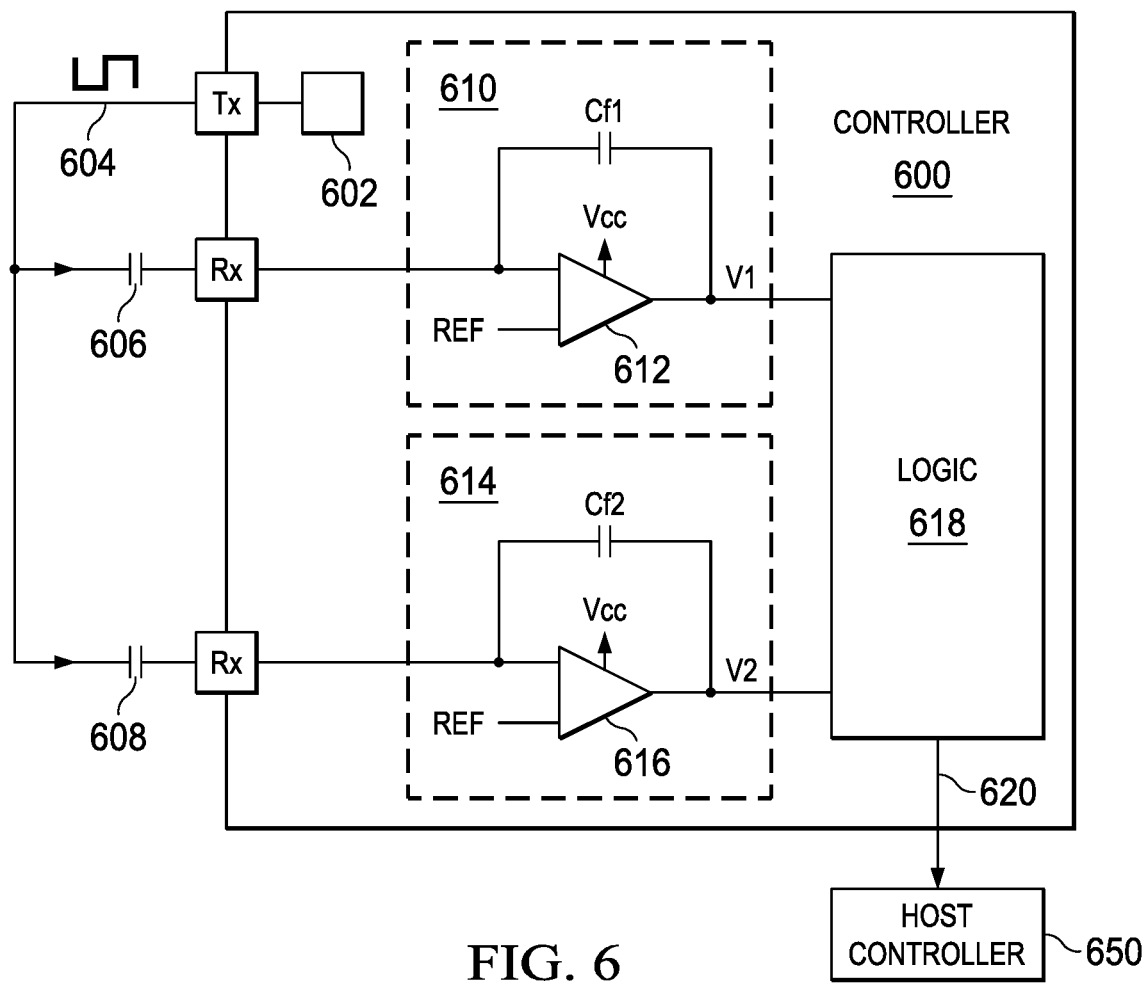
FIG. 6 illustrates an example embodiment of the controller circuitry.

Reference is now made to FIG. 6, which illustrates an example embodiment of the controller circuitry 600. In the embodiment illustrated in FIG. 6, the controller circuitry 600 includes circuitry 602 for generating the force signal 604. The controller circuitry 600 senses the first capacitance 606 at the first sensing electrode, and the second capacitance 608 at the second sensing electrode. The first capacitance 606 is sensed at first capacitance-to-voltage converter circuitry 610, which includes an operational amplifier 612 and feedback capacitor Cf1, and produces a first voltage V1 indicative of the sensed first capacitance 606. Thus, as the first capacitance 606 changes, for example, in response to a user touch, the first voltage V1 changes accordingly. The second capacitance 608 is sensed at second capacitance-to-voltage converter circuitry 614, which includes an operational amplifier 616 and feedback capacitor Cf2, and produces a second voltage V2 indicative of the sensed second capacitance 608. Thus, as the second capacitance 608 changes, for example, in response to a user touch, the second voltage V2 changes accordingly. The first voltage V1 and second voltage V2 (or a change in the first voltage $\Delta V1$ and a change in the second voltage $\Delta V2$) can be used to detect a touch, as discussed in greater detail below.

The first voltage V1 and second voltage V2 are received at logic circuitry 618. Upon start-up, the touch sensor, including controller circuitry 600, achieves a steady state, whereby steady state values of the first capacitance 606 and second capacitance 608 are detected and represented as steady state values of the first voltage V1 and second voltage V2, respectively. In some embodiments, these steady state voltage values are stored to be compared with real-time values of the first voltage V1 and second voltage V2. For example, the logic circuitry 618 may sample the first and second voltages V1 and V2 to determine a change in the first voltage $\Delta V1$ and a change in the second voltage $\Delta V2$, wherein the changes are determined relative to the steady state values of the first voltage V1 and the second voltage V2.

In some embodiments, the changes in the first and second voltages $\Delta V1$ and $\Delta V2$ are compared to determine whether a touch occurred. Specifically, the logic circuitry 618 compares the change in the first voltage $\Delta V1$ to the change in the second voltage $\Delta V2$ and indicates detection of a user touch when the change in the first voltage $\Delta V1$ is substantially greater than the change in the second voltage $\Delta V2$. For example, in some embodiments, the logic circuitry 618 may indicate a touch when the change in the first voltage ΔV1 is approximately 20% greater than the change in the second voltage ΔV2.

Stated differently, the logic circuitry 618 determines the change in the first voltage ΔV1 relative to the initial value (steady state value) of the first voltage V1, and determines the change in the second voltage ΔV2 relative to the initial value (steady state value) of the second voltage V2. The logic circuitry 618 then subtracts the second voltage change ΔV2 from the first voltage change ΔV1. If the difference is greater than a threshold value, then the logic circuitry 618 indicates a touch; otherwise, it does not. The threshold value may be selected to be any value. In some embodiments, however, the threshold is equal to 20% of the change in the second voltage ΔV2. In this embodiment, the logic circuitry 618 indicates a touch when the change in the first voltage ΔV1 is 20% greater than the change in the second voltage ΔV2.

In other embodiments, the logic circuitry 618 samples the instantaneous first and second voltage values V1 and V2, and then subtracts the second voltage V2 from the first voltage V1. If the difference is greater than a threshold value, then the logic circuitry 618 indicates a touch; otherwise, it does not. The threshold value may be selected to be any value. In some embodiments, however, the threshold is equal to 20% of the second voltage V2. In this embodiment, the logic circuitry 618 indicates a touch when the first voltage V1 is 20% greater than the second voltage V2.

The logic circuitry 618 produces an output signal 620 indicative of whether a touch was detected. The output signal 620 is received at host controller circuitry 650, which is used to perform an operation in response to, or in consideration of, the output signal 620.

Figure 7:
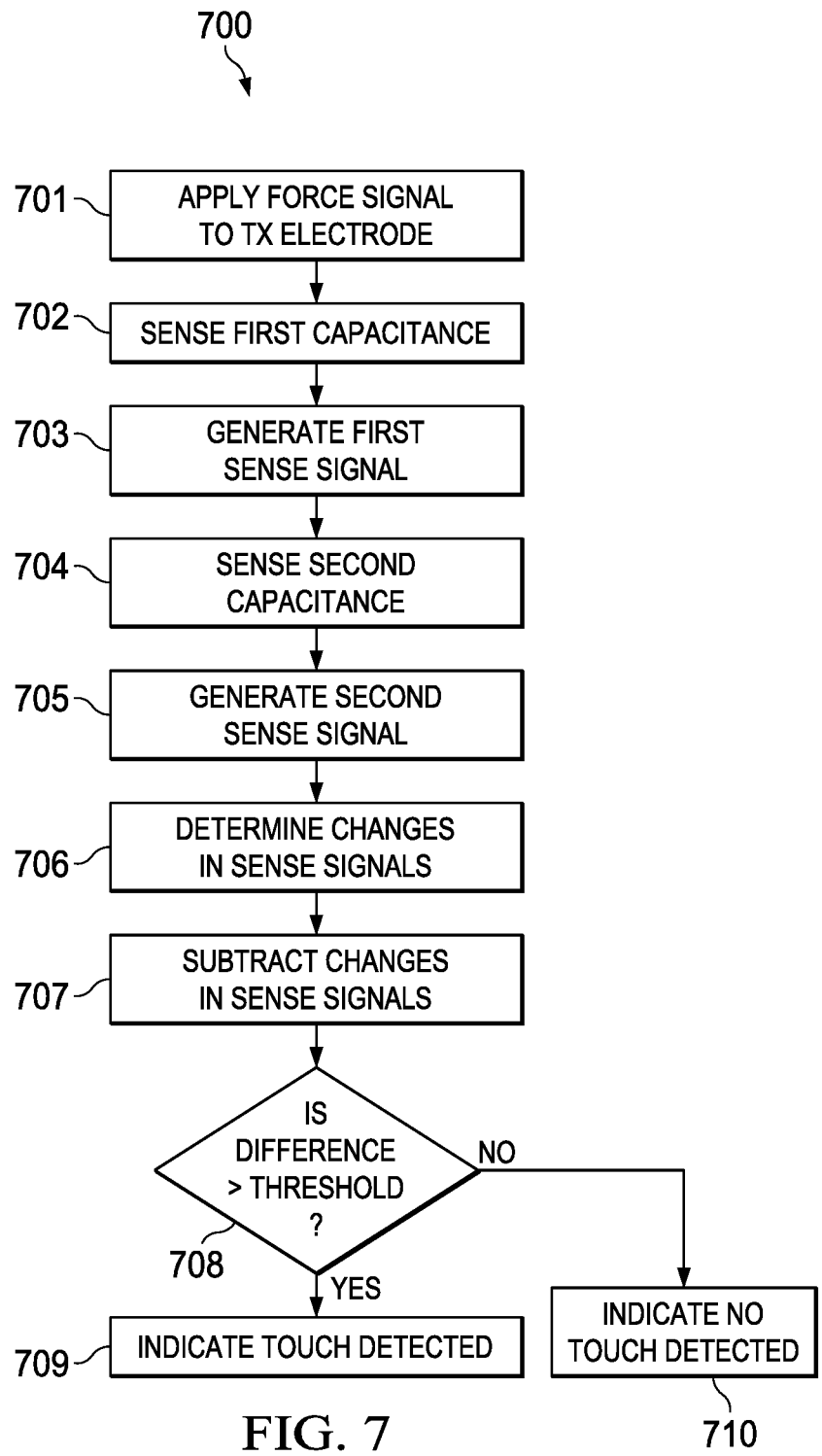
FIG. 7 illustrates a flow diagram illustrating a method in accordance with the present disclosure.

FIG. 7 illustrates a flow diagram 700 illustrating a method, in accordance with the foregoing disclosure, for using a touch sensor to distinguish between a finger hovering above the touch sensor and a touch from a stylus having a small contact surface area without having to adjust the sensitivity of the touch sensor. At Block 701, a force signal is applied to a transmit electrode, thereby causing the first and second capacitances at the respective first and second sensing electrodes. At Block 702, the first capacitance is sensed using the first sensing electrode. At Block 703, a first sense signal indicative of the sensed first capacitance is generated. At Block 704, the second capacitance is sensed using the second sensing electrode. At Block 705, a second sense signal indicative of the sensed second capacitance is generated. At Block 706, the first and second sense signals are sampled to determine a change in the first sense signal relative to the steady state value of the first sense signal and a change in the second sense signal relative to the steady state value of the second sense signal. At Block 707, the change in the second sense signal is subtracted from the change in the first sense signal. Block 708 determines whether the difference between the changes in the first and second sense signals is greater than a threshold value (e.g., 20% of the change in the second sense signal). If the difference between the changes in the first and second sense signals is greater than the threshold value, then at Block 709, a signal is produced indicating detection of a touch. Otherwise, at Block 710, a signal is produced indicating no touch was detected.

Figure 8:
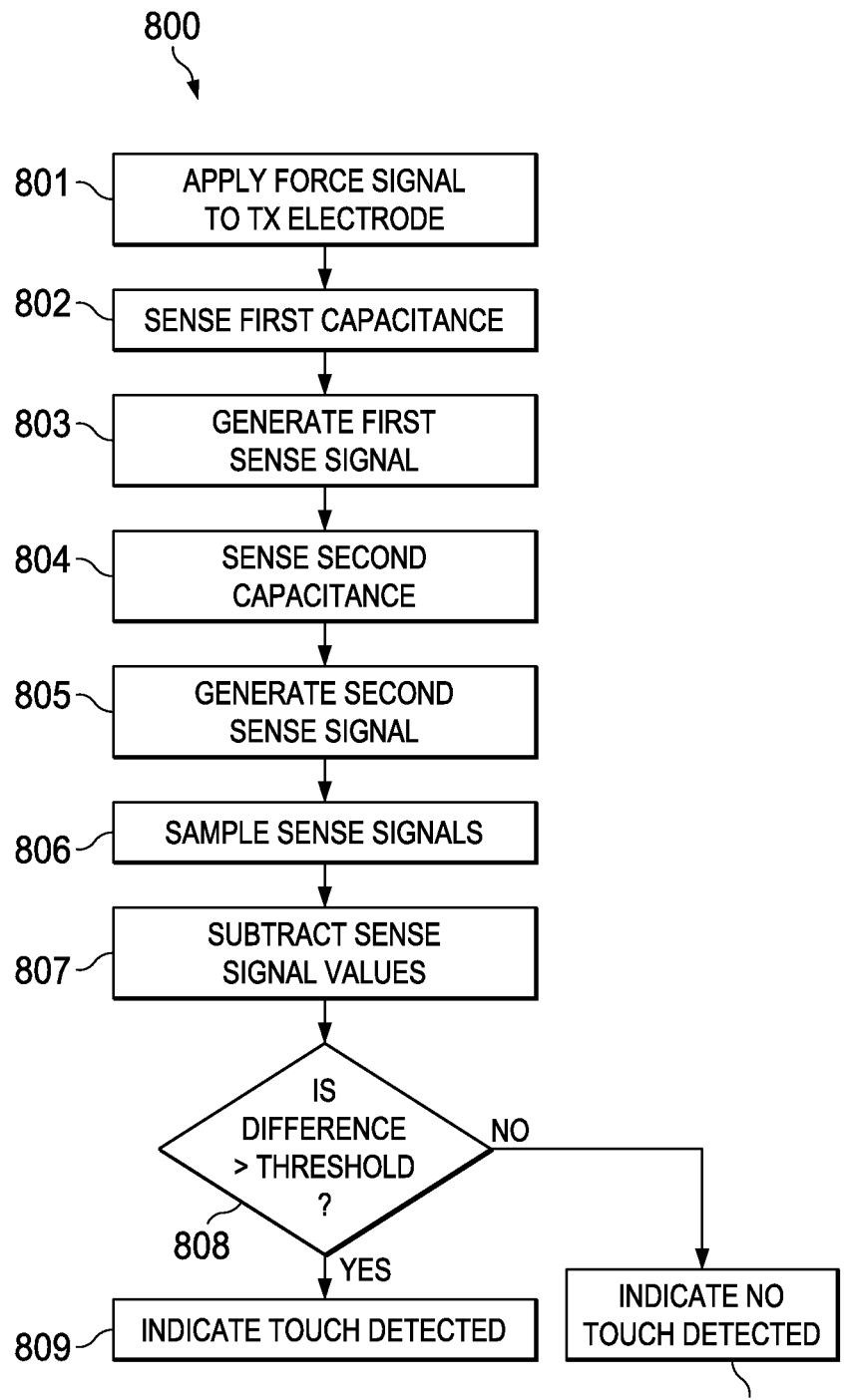
FIG. 8 illustrates a flow diagram illustrating a method in accordance with the present disclosure.

FIG. 8 illustrates a flow diagram 800 illustrating a method, in accordance with the foregoing disclosure, for using a touch sensor to distinguish between a finger hovering above the touch sensor and a touch from a stylus having a small contact surface area without having to adjust the sensitivity of the touch sensor. At Block 801, a force signal is applied to a transmit electrode, thereby causing the first and second capacitances at the respective first and second sensing electrodes. At Block 802, the first capacitance is sensed using the first sensing electrode. At Block 803, a first sense signal indicative of the sensed first capacitance is generated. At Block 804, the second capacitance is sensed using the second sensing electrode. At Block 805, a second sense signal indicative of the sensed second capacitance is generated. At Block 806, the first and second sense signals are sampled to determine the instantaneous values of the first and second sense signals. At Block 807, the second sense signal value is subtracted from the first sense signal value. Block 808 determines whether the difference between the first and second sense signal values is greater than a threshold value (e.g., 20% of the second sense signal). If the difference is greater than the threshold, then at Block 809, a signal is produced indicating detection of a touch. Otherwise, at Block 810, a signal is produced indicating no touch was detected.

It should be appreciated that other touch sensor designs may be implemented other than those illustrated and described herein. For example, the touch sensor may implement other sensor patterns other than those having interdigitated fingers or diamonds. Such alternate embodiments may also include those in which the first sensing electrode is positioned between the transmit electrode and the second sensing electrode.

Figure 9:
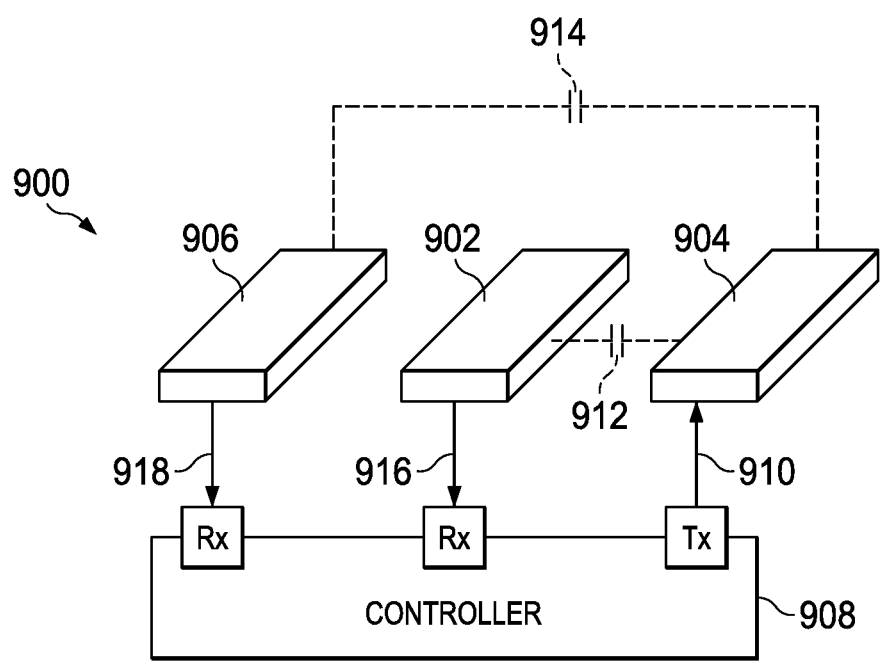
FIG. 9 illustrates an alternate embodiment of a touch sensor having the first sensing electrode positioned between the transmit electrode and the second sensing electrode.

For example, FIG. 9 illustrates such an embodiment of a touch sensor 900 having a first sensing electrode 902 positioned between a transmit electrode 904 and a second sensing electrode 906. The embodiment illustrated in FIG. 9 further includes controller circuitry 908. As with the embodiments discussed herein, the controller circuitry 908 applies a force signal 910 to the transmit electrode 904 to generate a first capacitance 912 using the first sensing electrode 902, and a second capacitance 914 using the second sensing electrode 906. The controller 908 receives from the first sensing electrode 902 a first sense signal 916 indicative of the first capacitance 912, and receives from the second sensing electrode 906 a second sense signal 918 indicative of the second capacitance 914. The controller circuitry 908 compares the changes in the sense signals 916 and 918 to determine a touch detection in accordance with the foregoing disclosure.

The foregoing description has provided by way of exemplary and non-limiting examples a full and informative description of one or more exemplary embodiments of this invention. However, various modifications and adaptations may become apparent to those skilled in the relevant arts in view of the foregoing description when read in conjunction with the accompanying drawings and the appended claims. However, all such and similar modifications of the teachings of this invention will still fall within the scope of this invention as defined in the appended claims.

For example, in some embodiments, the first sensing electrode and transmit electrode may be considered a single capacitive sensing structure that is capable of operating independent from the second sensing electrode. In such embodiments, the second sensing electrode is positioned substantially around the perimeter of the capacitive sensing structure. In other embodiments, the transmit electrode and second sensing electrode may be considered a single capacitive sensing structure that is capable of operating independent from the first sensing electrode. In such embodiments, the first capacitive sensor is positioned along an interior of the capacitive sensing structure, and the second sensing electrode is positioned substantially around the perimeter of the transmit electrode.

The foregoing sensor and method may be incorporated in multiple touch sensor types including, for example, zero-dimensional sensors, one-dimensional sensors, two-dimensional sensors, and wheel sensors.

What is claimed is:

1. A capacitive sensing system, comprising:
   a first sensing electrode located in a first layer and configured to sense a first capacitance and produce a first sense signal indicative of the sensed first capacitance;
   a transmit electrode located in the first layer and positioned surrounding at least 90% of a perimeter of the first sensing electrode;
   a second sensing electrode located in the first layer and positioned surrounding at least 90% of a perimeter of the transmit electrode, the second sensing electrode configured to sense a second capacitance and produce a second sense signal indicative of the sensed second capacitance; and
   controller circuitry configured to receive the first and second sense signals, and to:
   generate a first voltage from the first sense signal;
   generate a second voltage from the second sense signal;
   determine a steady state value of the first and second voltages;
   determine a change in the sensed first capacitance by subtracting the first voltage from the steady state value of the first voltage to produce a first changed voltage;
   determine a change in the sensed second capacitance by subtracting the second voltage from the steady state value of the second voltage to produce a second changed voltage;
   compare the change in the sensed first capacitance to the change in the sensed second capacitance; and
   produce an output signal indicative of a user touch based upon the comparison between the change in the sensed first capacitance and the change in the sensed second capacitance;
   wherein comparing the change in the sensed first capacitance to the change in the sensed second capacitance comprises:
   subtracting the second changed voltage from the first changed voltage to produce a voltage difference; and
   comparing the voltage difference to a threshold voltage.

2. The capacitive sensing system of claim 1, wherein the threshold voltage is 20% of the second changed voltage.

3. The capacitive sensing system of claim 1, wherein the first sensing electrode is diamond shaped.

4. A capacitive sensing system, comprising:
   a first sensing electrode located in a first layer and configured to sense a first capacitance and produce a first sense signal indicative of the sensed first capacitance, wherein the first sensing electrode is diamond shaped;
   a transmit electrode located in the first layer and positioned surrounding at least 90% of a perimeter of the first sensing electrode, wherein the transmit electrode is diamond shaped with a diamond shaped cutout therein, the diamond shaped cutout in the transmit electrode being greater in surface area than the first sensing electrode;
   a second sensing electrode located in the first layer and positioned surrounding at least 90% of a perimeter of the transmit electrode, the second sensing electrode configured to sense a second capacitance and produce a second sense signal indicative of the sensed second capacitance; and
   controller circuitry configured to receive the first and second sense signals, to compare a change in the sensed first capacitance to a change in the sensed second capacitance, and to produce an output signal indicative of a user touch based upon the comparison between the change in the sensed first capacitance and the change in the sensed second capacitance.

5. The capacitive sensing system of claim 4, wherein the transmit electrode includes an open region to allow for electrical connections to the first sensing electrode.

6. The capacitive sensing system of claim 4, wherein the first sensing electrode and transmit electrode are separated by a first gap.

7. The capacitive sensing system of claim 4, wherein the second sensing electrode is diamond shaped with a diamond shaped cutout therein, the diamond shaped cutout in the second sensing electrode being greater in surface area than a sum of surface areas of the first sensing electrode, the transmit electrode, and the diamond shaped cutout of the transmit electrode.

8. The capacitive sensing system of claim 7, wherein the second sensing electrode includes an open region to allow for electrical connections to the first sensing electrode and the transmit electrode.

9. The capacitive sensing system of claim 7, wherein the transmit electrode and the second sensing electrode are separated by a second gap.

10. A capacitive sensing system, comprising:
    a capacitive sensing structure, comprising:
    a first sensing electrode located in a first layer and configured to sense a first capacitance and produce a first sense signal indicative of the sensed first capacitance;
    a transmit electrode located in the first layer; and
    a second sensing electrode located in the first layer and positioned surrounding at least 90% of a perimeter of the capacitive sensing structure, the second sensing electrode configured to sense a second capacitance and produce a second sense signal indicative of the sensed second capacitance; and
    controller circuitry configured to receive the first and second sense signals, and to:
    generate a first voltage from the first sense signal;
    generate a second voltage from the second sense signal;
    determine a steady state value of the first and second voltages;
    determine a change in the sensed first capacitance by subtracting the first voltage from the steady state value of the first voltage to produce a first changed voltage;
    determine a change in the sensed second capacitance by subtracting the second voltage from the steady state value of the second voltage to produce a second changed voltage;
    compare the change in the sensed first capacitance to the change in the sensed second capacitance, and to produce an output signal indicative of a user touch based upon the comparison between the change in the sensed first capacitance and the change in the sensed second capacitances;

wherein comparing the change in the sensed first capacitance to the change in the sensed second capacitance comprises:
subtracting the second changed voltage from the first changed voltage to produce a voltage difference; and
comparing the voltage difference to a threshold voltage.

11. The capacitive sensing system of claim 10, wherein the threshold voltage is 20% of the second changed voltage.

12. The capacitive sensing system of claim 10, wherein the first sensing electrode is diamond shaped.

13. A capacitive sensing system, comprising:
a capacitive sensing structure, comprising:
a first sensing electrode located in a first layer and configured to sense a first capacitance and produce a first sense signal indicative of the sensed first capacitance, wherein the first sensing electrode is diamond shaped; and
a transmit electrode located in the first layer, wherein the transmit electrode is diamond shaped with a diamond shaped cutout therein, the diamond shaped cutout in the transmit electrode being greater in surface area than the first sensing electrode;
a second sensing electrode located in the first layer and positioned surrounding at least 90% of a perimeter of the capacitive sensing structure, the second sensing electrode configured to sense a second capacitance and produce a second sense signal indicative of the sensed second capacitance; and
controller circuitry configured to receive the first and second sense signals, to compare a change in the sensed first capacitance to a change in the sensed second capacitance, and to produce an output signal indicative of a user touch based upon the comparison between the change in the sensed first capacitance and the change in the sensed second capacitance.

14. The capacitive sensing system of claim 13, wherein the transmit electrode includes an open region to allow for electrical connections to the first sensing electrode.

15. The capacitive sensing system of claim 13, wherein the first sensing electrode and transmit electrode are separated by a first gap.

16. The capacitive sensing system of claim 13, wherein the second sensing electrode is diamond shaped with a diamond shaped cutout therein, the diamond shaped cutout in the second sensing electrode being greater in surface area than a sum of surface areas of the first sensing electrode, the transmit electrode, and the diamond shaped cutout of the transmit electrode.

17. The capacitive sensing system of claim 16, wherein the second sensing electrode includes an open region to allow for electrical connections to the first sensing electrode and the transmit electrode.

18. The capacitive sensing system of claim 16, wherein the transmit electrode and the second sensing electrode are separated by a second gap.

19. A method for detecting a touch, comprising:
applying a force signal to a capacitive sensing structure comprising a transmit electrode and a first sensing electrode each located in a same first layer;
sensing a first capacitance via the first sensing electrode;
generating a first voltage indicative of the sensed first capacitance;
sensing a second capacitance via a second sensing electrode located in the first layer, wherein the second sensing electrode is positioned surrounding at least 90% of a perimeter of the capacitive sensing structure;
generating a second voltage indicative of the sensed second capacitance;
determining a steady state value of the first and second voltages;
determining a change in the sensed first capacitance by subtracting the first voltage from the steady state value of the first voltage to produce a first changed voltage;
determining a change in the sensed second capacitance by subtracting the second voltage from the steady state value of the second voltage to produce a second changed voltage;
comparing the change in the sensed first capacitance to the change in the sensed second capacitance; and
generating an output signal indicative of a user touch based upon the comparison between the change in the sensed first capacitance and the change in the sensed second capacitance;
wherein comparing the change in the sensed first capacitance to the change in the sensed second capacitance comprises:
subtracting the second changed voltage from the first changed voltage to produce a voltage difference; and
comparing the voltage difference to a threshold voltage.

20. The method of claim 19, wherein the threshold voltage is 20% of the second changed voltage.

* * * * *